United States Patent
Gunness

(12) 
(10) Patent No.: US 6,193,583 B1
(45) Date of Patent: Feb. 27, 2001

(54) FLAIL-TYPE HONEYCOMB DECAPPER

(76) Inventor: Donald B. Gunness, P.O. Box 106, Abercrombie, ND (US) 58001

( * ) Notice: Subject to any disclaimer, the term of this patent is extended or adjusted under 35 U.S.C. 154(b) by 0 days.

(21) Appl. No.: 09/369,163

(22) Filed: Aug. 5, 1999

(51) Int. Cl.⁷ .................................................. A01K 59/02
(52) U.S. Cl. ................................................................ 449/54
(58) Field of Search .......................................... 449/54, 50

(56) References Cited

U.S. PATENT DOCUMENTS

| | | | |
|---|---|---|---|
| 2,580,397 | * | 1/1952 | Bogenschutz . |
| 3,737,931 | * | 6/1973 | Hodgson ................................ 449/54 |
| 4,765,008 | * | 8/1988 | Gunness ................................ 449/54 |
| 5,662,511 | * | 9/1997 | Penrose et al. ....................... 449/50 |

* cited by examiner

*Primary Examiner*—Peter M. Poon
*Assistant Examiner*—Yvonne R. Abbott
(74) *Attorney, Agent, or Firm*—David A. Lingbeck

(57) ABSTRACT

An improved apparatus for horizontally uncapping wax from both sides of a honeycomb. The improved apparatus includes a pair of flail elements, a first and second roller conveyors, and a height adjustable feeder roller member spaced above the first roller conveyor for feeding the honeycombs at an even rate of speed between the flail elements to decap the honeycombs more evenly, and a height adjustable extractor roller member spaced above the second roller conveyor for removing the flailed honeycombs. The upper and lower flail elements are also height adjustable and the first and second roller conveyors are removably mounted to the apparatus. The pair of flail elements are located in a gap defined between the first and second roller conveyors.

14 Claims, 5 Drawing Sheets

FLAIL-TYPE HONEYCOMB DECAPPER

BACKGROUND OF THE INVENTION

This invention relates to an improved flail-type honeycomb decapper for decapping wax from cells on both sides of honeycombs simultaneously.

A conventional procedure in the extraction of honey from the honeycomb is to use a special knife heated by steam or electricity to remove the wax caps from the cells of the honeycomb. Other procedures include the use of machines which automatically decap he honeycombs.

One known device is set forth in U.S. Pat. No. 2,448,775 issued to Crane on Sep. 7, 1948 and discloses an endless conveyor having spaced lugs for receiving individual honeycombs. Each honeycomb is moved by the conveyor through a station including a pair of brushes and a spring loaded shoe having curved end portions which serve to hold the honeycomb frame snugly in place as it passes through the brushes. The rotating brushes act on both side of the honeycomb frame simultaneously.

Another known device is set forth in U.S. Pat. No. 2,448,986 issued to Ladwig on Sep. 7, 1948 and discloses a honeycomb frame placed on a carriage which slides upon a pair of rails over a drum having prongs which perform the decapping operation.

Also, another known device is set forth in U.S. Pat. No. 1,523,963 issued to Hodgson on Jan. 20, 1925 and discloses a decapping device for honeycombs which includes rotating brushes which act on opposite sides of the honeycomb.

Further, the present invention is an improvement of the original flail-type honeycomb decapper, U.S. Pat. No. 4,765,008 and invented by Donald Gunness on Aug. 23, 1988 and comprises a frame, upper and lower flailing elements driven by variable speed motors with fans and including a plurality of chain pieces, a first chain driven conveyor fixedly mounted to the frame, and a second chain driven conveyor fixedly mounted to the frame. The conveyors nor the upper flail element is adjustable.

The present invention is an improvement of the original flail-type honeycomb decapper.

SUMMARY OF THE INVENTION

The present invention relates to an improved flail-type honeycomb decapper apparatus comprising a frame having a base, upright members and an overhead cross member, and further comprising a first and second roller conveyor removably mounted to the frame and being spaced thus defining a gap therebetween, an upper and lower flailing elements comprising a plurality of chain pieces and being partially disposed in the gap for decapping wax from the honeycombs, and a feeder roller member disposed above and adjustably spaced from a back end of the first roller conveyor and spaced from the upper flailing element, and an extractor roller member disposed above and adjustably spaced from a front end of the second roller conveyor and spaced from the upper flailing element. Unlike the original decapper apparatus, the feeder roller member of the present invention urges the honeycombs at an even rate of speed between the flailing elements to decap the honeycombs more evenly.

One objective of the present invention is to provide an improved flail-type honeycomb decapper apparatus which can be operated by one or more persons as needed unlike the original decapper apparatus.

Another objective of the present invention is to provide an improved flail-type honeycomb decapper apparatus which is less bulky and more transportable than the original decapper apparatus making it more ideally suited for use in a smaller honey house operation.

Also, another objective of the present invention is to provide an improved flail-type honeycomb decapper apparatus where the first and second roller conveyors can be easily mounted and removed from the frame unlike the original decapper apparatus.

Yet, another objective of the present invention is to provide an improved flail-type honeycomb decapper apparatus where the feeder and extractor roller members and the upper and lower flailing elements can be raised or lowered to accommodate different thicknesses of honeycombs.

Further objectives and advantages of the present invention will become apparent as the description proceeds and when taken in conjunction with the accompanying drawings wherein:

DETAILED DESCRIPTION OF THE INVENTION

Figure 1:
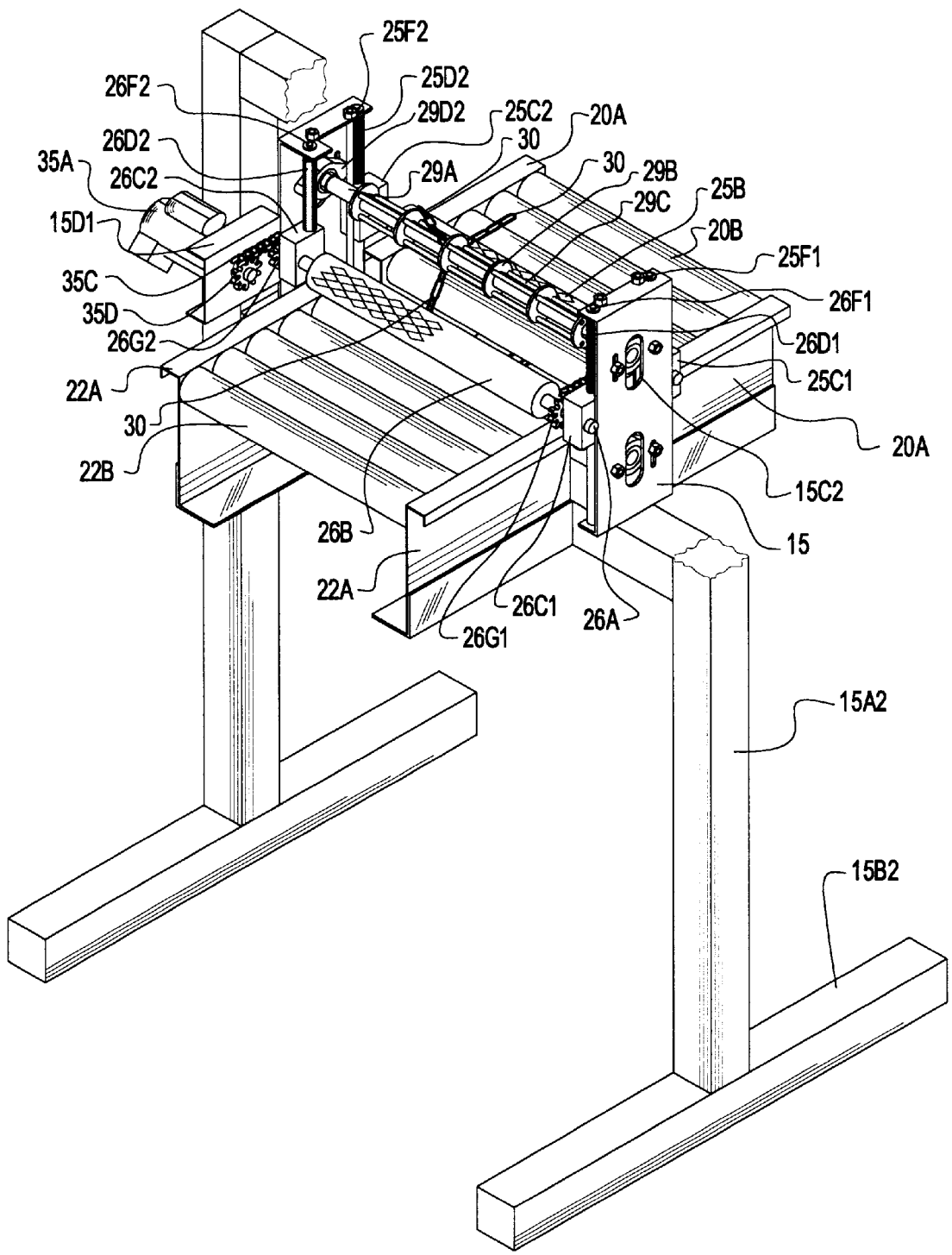
FIG. 1 is a first perspective view of the improved flail-type honeycomb decapper apparatus.
Figure 2:
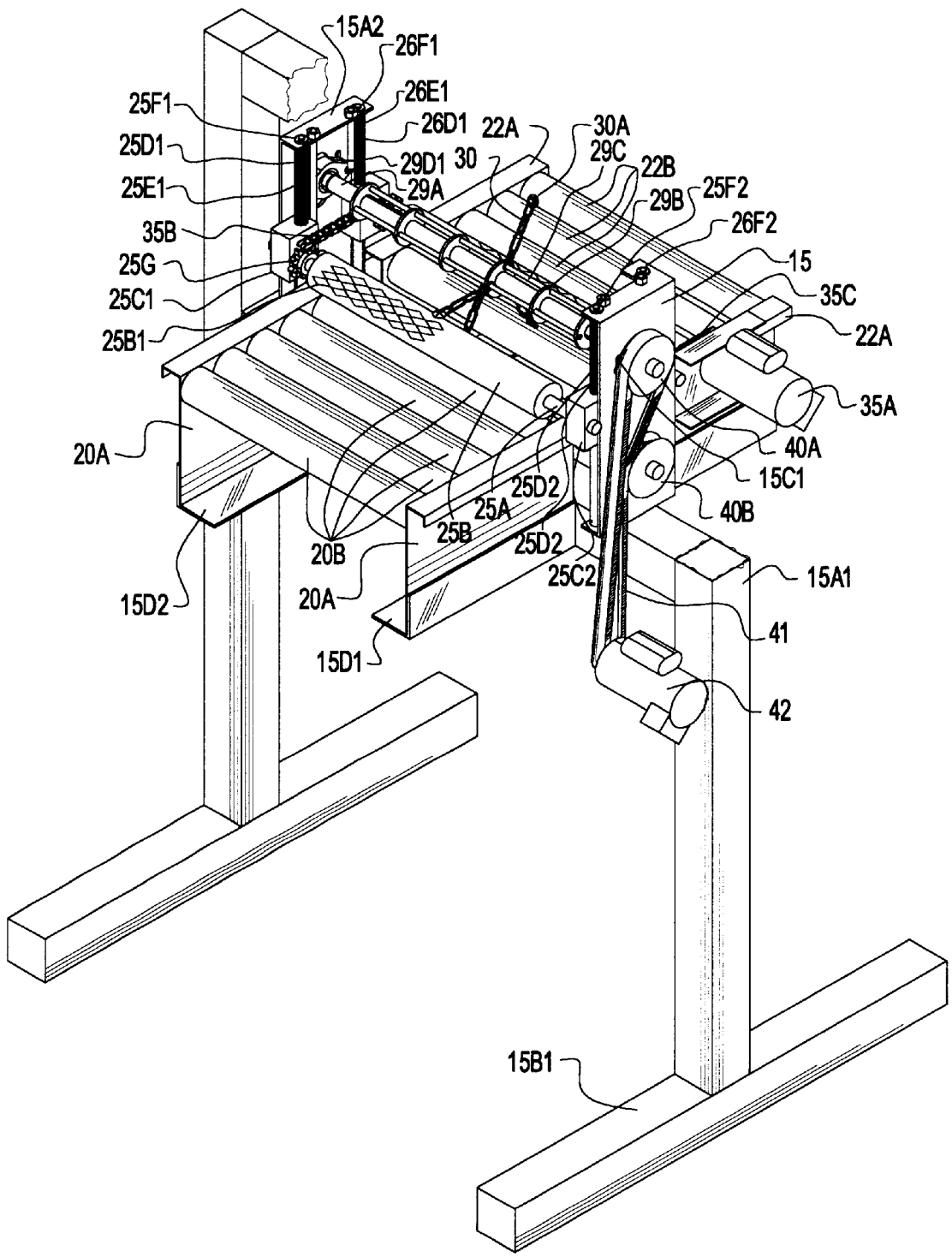
FIG. 2 is a second perspective view of the improved flail-type honeycomb decapper apparatus.
Figure 3:
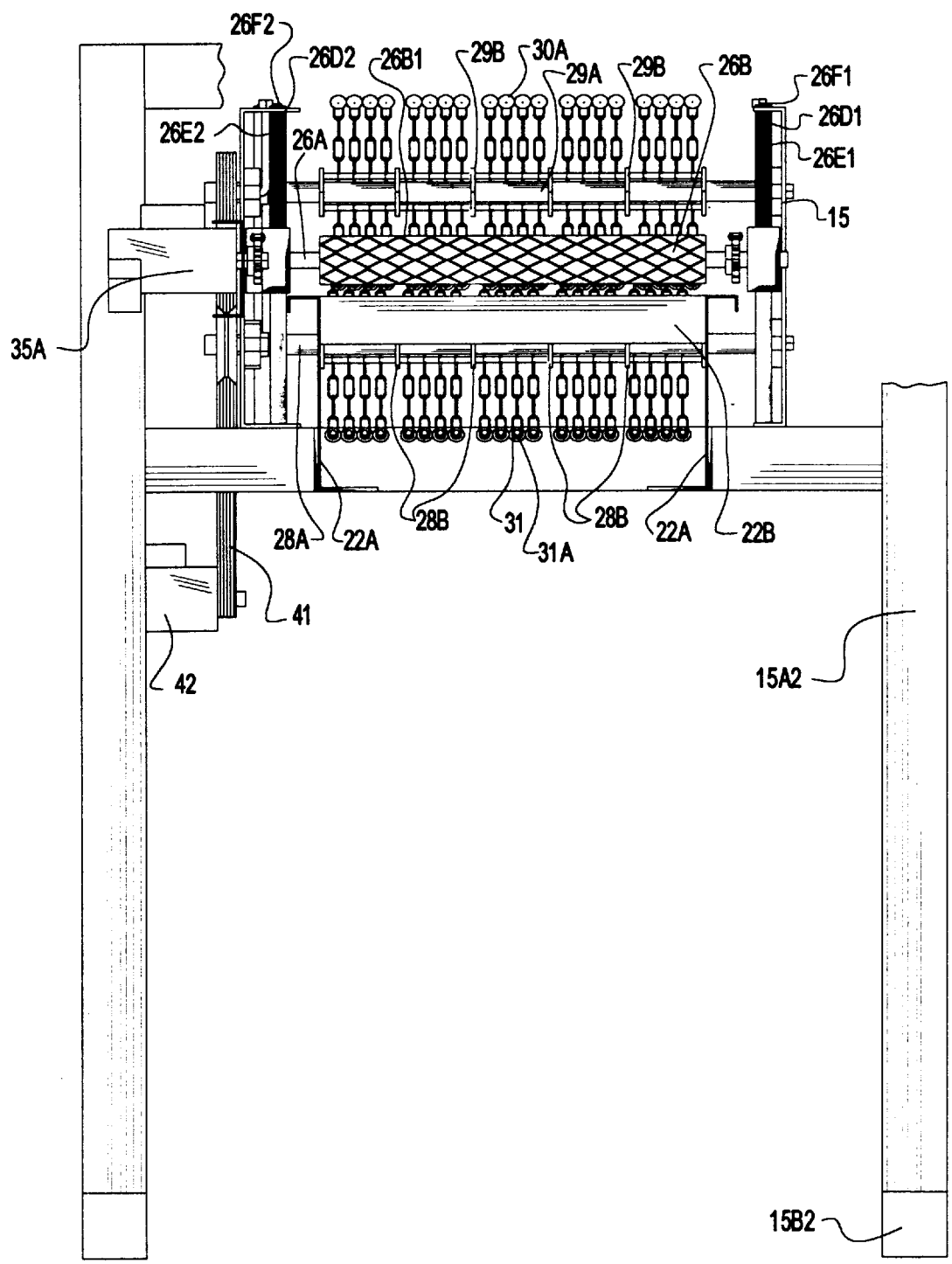
FIG. 3 is a front elevational view of the improved flail-type honeycomb decapper apparatus.
Figure 4:
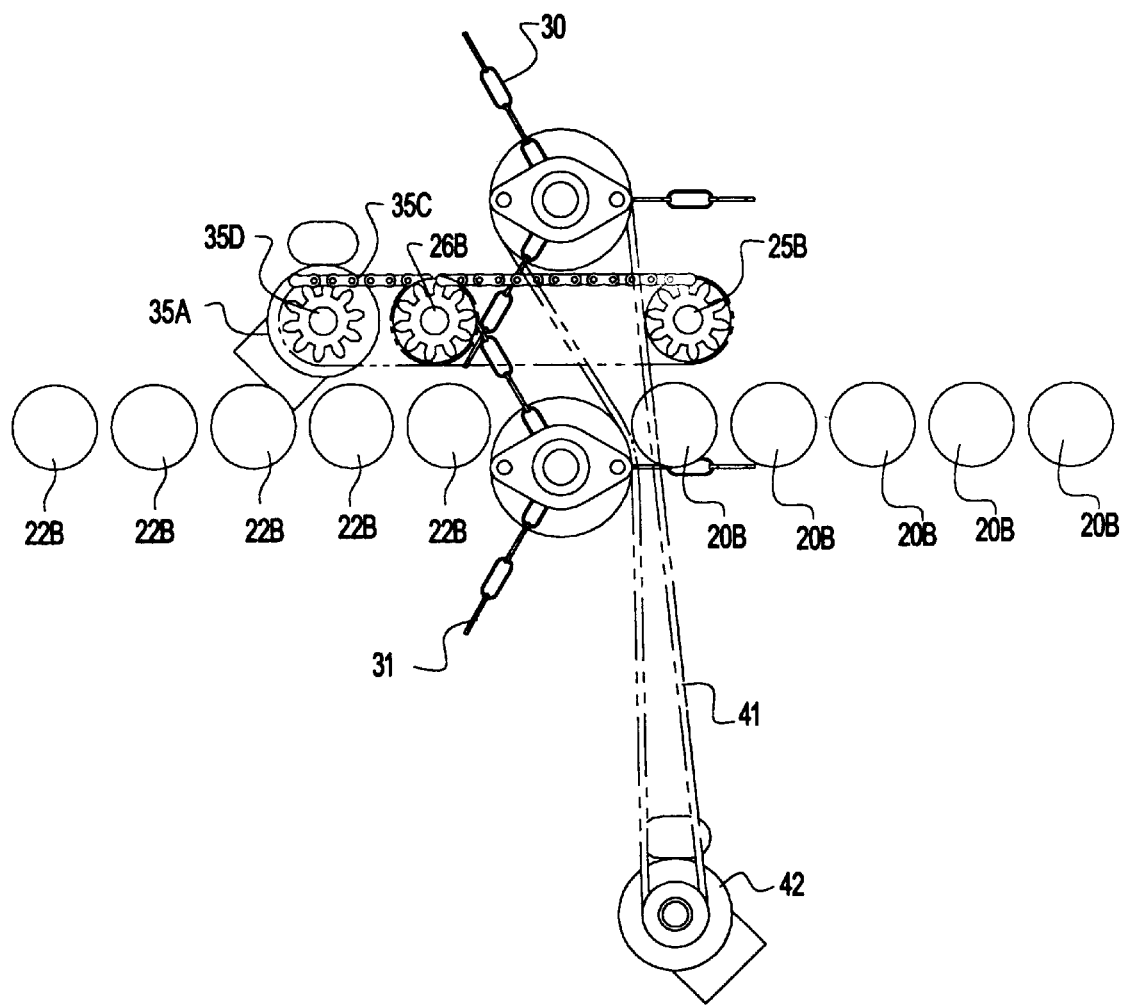
FIG. 4 is a side elevational view of the flailing elements of the improved decapper apparatus.
Figure 5:
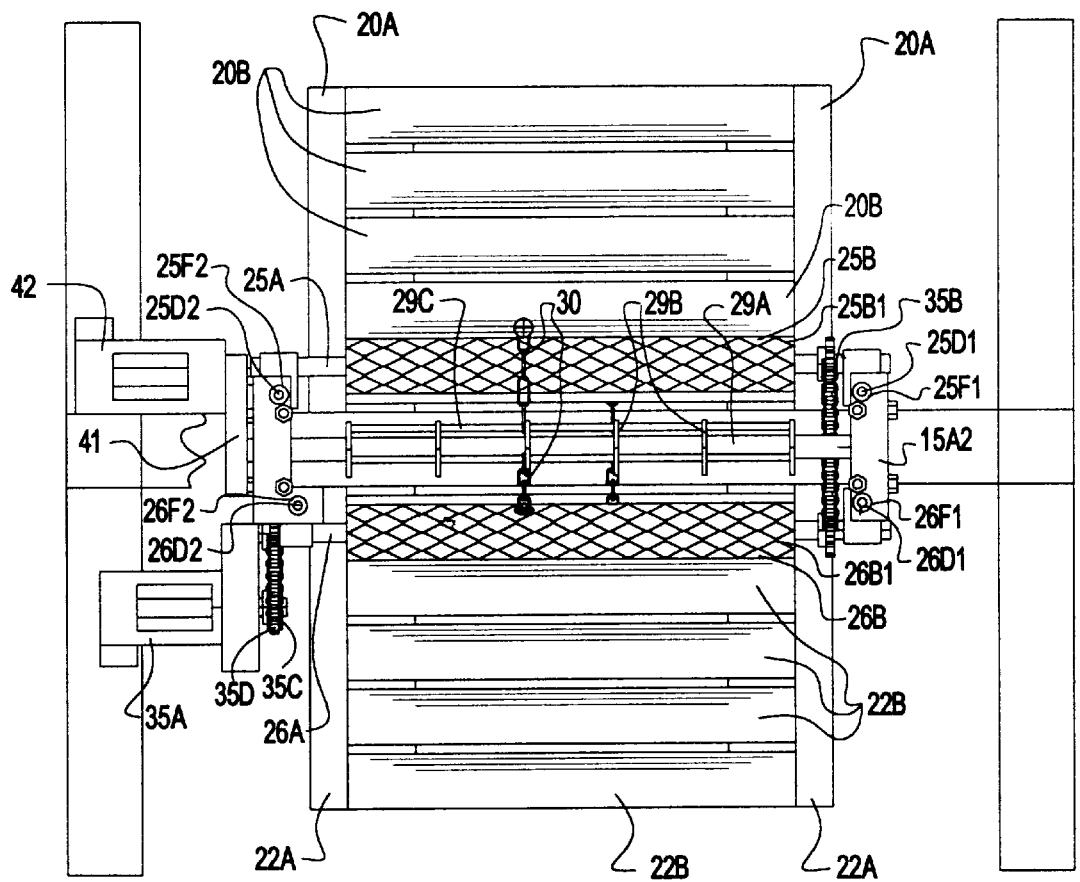
FIG. 5 is a top plan view of the improved decapper apparatus.

Referring to the drawings in FIGS. 1–5, the improved flail-type honeycomb decapper for decapping wax from opposite sides of a honeycomb simultaneously comprises a frame 15 having a base which includes a pair of elongate members 15B1–B2 each having a longitudinal slot extending through the top end and along the length thereof, and further having a pair of upright members 15A1–A2 each of which is conventionally and securely mounted upon a respective elongate member 15B1–B2. The upright members 15A1–A2 are spaced apart and are interconnected by an elongate overhead member. A pair of bracket members 15D1–D2 are securely and conventionally attached to the upright members 15A1–A2 with one of the bracket members 15D1 being attached at a central portion of one of the upright members 15A1 and extending outwardly from the front and back ends of the frame 15 and with the other of the upright members 15D2 being attached at a central portion of the other of the upright members 15A2 and also extending outwardly from the front and back ends of the frame 15. Each bracket member 15D1–D2 has a flanged portion extending along a longitudinal edge thereof. The bracket members 15D1–D2 are spaced from one another with the flanged portion of each bracket member 15D1–D2 extending in the direction of the other flanged portion.

A first roller conveyor having a rack 22A and a plurality of rollers 22B spaced and laterally aligned in a plane and being rotatably mounted to the rack 22A is removably mounted upon the flanged portions of the bracket members 15D1–D2 and extends to the front end of frame 15. A second roller conveyor also having a rack 20A and a plurality of rollers 20B spaced and laterally aligned in a plane and being rotatably mounted to the rack 20A is removably mounted upon the flanged portions of the bracket members 15D1–D2 and extends to the back end of the frame 15 and is spaced from the first roller conveyor 22A to form a gap therebetween. When not in use or when transporting the decapper apparatus, the user can simply lift off the first and second roller conveyors 20A, 22A from the bracket members 15D1–D2 which makes the decapper apparatus less bulky and easier to move and handle.

A feeder roller member comprising a feeder shaft 26A and a tubular member 26B having a grated surface 26B1 and being mounted about the feeder shaft 26A is disposed above and adjustably spaced from the first roller conveyor 22A near a back end thereof. The ends of the feeder shaft 26A are journaled in a pair of bearing members 26C1–C2 each of which is conventionally secured to a respective threaded elongate support member 26D1–D2 having a compression spring 26E1–E2 mounted thereabout and which is adjustably and conventionally fastened to a respective feeder bracket member which is conventionally secured to the frame 15. The feeder roller member has a longitudinal axis which is generally parallel to the rollers 22B of the first roller conveyor. The feeder roller member can be easily and quickly adjusted relative to the first roller conveyor with conventional fasteners 26F1–F2 by simply raising or lowering the threaded elongate support members 26D1–D2 relative to the feeder bracket members depending upon the thickness of the honeycomb frame being decapped by this apparatus. A first sprocket member 26G2 is securely and conventionally mounted to a first end of the feeder shaft 26A, and an endless chain 35D is carried about the first sprocket member 26G2 and a motor sprocket member 35D which is conventionally and securely mounted about a motor shaft of a motor 35A used to drive or rotate the feeder roller member 26A and which is conventionally mounted to the frame 15.

An extractor roller member comprising an extractor shaft 25A and a tubular member 25B having a grated surface 25B1 and being mounted about the extractor shaft 25A is disposed above and adjustably spaced from the second roller conveyor near a front end thereof. The ends of the extractor shaft are journaled in a pair of bearing members 25C1–C2 each of which is conventionally secured to a respective threaded elongate support member 25D1–D2 having a compression spring 25E1–E2 mounted thereabout and which is adjustably and conventionally fastened to a respective extractor bracket member which is conventionally secured to the frame 15. The extractor roller member has a longitudinal axis which is generally parallel to the rollers 20B of the second roller conveyor. The extractor roller member is automatically adjusted relative to the second roller conveyor with conventional fasteners 25F1–F2 by simply raising or lowering the threaded elongate support members 25D1–D2 relative to the extractor bracket members depending upon the thickness of the honeycomb frame being decapped by this apparatus. A sprocket member 25G is securely and conventionally mounted to one of the ends of the extractor shaft 25A, and an endless chain 35B is carried about the sprocket member 25G and about a second sprocket member 26G1 which is conventionally mounted about a second end of the feeder shaft 26A.

A flail assembly is supported centrally on the frame essentially below the overhead cross member and is partially disposed in the gap defined between the first and second roller conveyors. The flail assembly includes an open-bottom cover (not shown) which is secured to and supported above the overhead cross member. This top cover houses an upper chain flail element which comprises several rows of chain pieces 30 attached to a rotatable shaft 29A so that as the shaft 29A rotates, the chain pieces 30 create flailing action. The chain pieces 30 may be sash chain or the like, and may be attached by spot welding, rivets or the like. Bearings are provided in elongate slots 15C1–C2 in the upright members of the frame 15 for rotatably supporting the shaft 29A relative to the top cover. A second set of bearings are provided in the upright members of the frame for supporting a second, lower flail element. Preferably, the lower flail element is of the same construction as in the upper flail element. Each of the flailing elements comprises a driven shaft 28A, 29A having a variable speed pulley 40A–B conventionally mounted to an end thereof with an endless belt 41 being carried thereabout and about a variable speed pulley conventionally mounted about a shaft of a motor 42, and three transverse rows of chain pieces 30, 31, with each row extending across the entirety of the conveyance path defined by the first and second roller conveyors. Preferably, each piece of chain comprises four links (although a greater number or a less number can also be used), with each piece being connected at one end to a rod 29C, which in turn is inserted through apertures in a plurality of annuluses or washers 28B, 29B. The washers 28B, 29B are welded to the shaft 28A, 29A at spaced locations along the shaft 28A, 29A so that the shaft 28A, 29A and the washers 28B, 29B rotate together. Preferably, there are three rods 29C located symmetrically and parallel to the driven shaft 28A, 29A. In the preferred embodiment, there are six washers 28B, 29B spaced generally equally along the shaft 28A, 29A, with each rod 29C supporting between the first two washers and the last two washers a total of fourteen pieces of chain. Preferably, the three remaining segments of the rod each hold a total of fourteen pieces of chain pieces so that each row presents chain in groups of 14, 14, 14, 14, and 14 pieces of chain. The opposite ends of each piece of chain are unconnected and allowed to extend radially as the driven shaft 28A, 29A is caused to rotate.

Preferably, the shafts 28A, 29A of the upper and lower flailing elements are spaced sufficiently apart so that the free ends of the chain pieces 30, 31 do not interfere with each other. Additionally, both of the shafts 28A, 29A are located sufficiently from the back end of the first roller conveyor and the front end of the second roller conveyor and from the feeder and extractor roller members so that the free ends of the chain pieces 30, 31 do not cause interference therewith. However, as the feeder roller member delivers a honeycomb to the flailing assembly, the free ends of the chain pieces 30, 31 come into contact and strike the honeycomb across the entire width of the honeycomb frame. The distance between the upper and lower flailing elements can simply be adjusted by the user unsecuring and moving the bearings supporting the shafts of the upper and lower flailing element along the elongate slots 15C1–C2 in the upright members of the frame 15 and then resecuring the bearings with the upper flailing element being either closer to or farther from the lower flailing element. To prevent undue wear to the free ends of the chain pieces 30, 31, rivets 30A, 31A are conventionally secured to the free ends of the chain pieces 30, 31.

In operation, the improved flail-type decapper apparatus is preferably arranged waist high to the operator so as to facilitate placement of the honeycombs upon the first roller conveyor and facilitate removal of decapped honeycombs from the second roller conveyor. The speed of the variable speed pulley on the motor is selected according to the amount of wax appearing on the face of the honeycombs. A higher pulley speed is used for decapping a thicker accumulation of wax. One or more honeycombs are laid horizontally on their sides upon the first roller conveyor. The user moves the honeycombs manually into engagement until the first roller conveyor moves the honeycomb into and across the gap. Thereupon, the action of the chain rows upon the faces of the honeycomb breaks up and removes the wax from both sides of the honeycomb simultaneously and also acts to move the honeycomb across the gap. Since the flailing elements project entirely across the path defined by the feeder and extractor roller members, the flailing elements act upon the entirety of the honeycombs so as to remove wax in all regions of the honeycombs. Each chain piece 30, 31 is allowed to flex and rid itself of bits and pieces of material which would otherwise accumulate as occurs with brushes. During this whole operation, wax fragments and honey removed from the honeycombs are allowed to pass through the gap between the first and second roller conveyors to collect in a trough (not shown). The top cover serves to direct material flung from the upper flailing element toward the trough. This decapper apparatus is ideally suited to be operated by just one person rather than two people as is required by the original more bulky decapper apparatus. The user can stand to one side of the frame and can control both the feeding and extracting of the honeycombs without needing help, because the first and second roller conveyors are designed to support the honeycombs like the bulky chain driven conveyors of the original decapper apparatus, and the feeder and extractor roller members are disposed closely to either side of the flailing elements within easy control and reach by the lone person. The user moves the honeycombs on the first roller conveyor by hand until it becomes engaged by the feeder roller member which moves the honeycombs across the gap, and as the honeycombs move across the gap, the extractor roller member engages the honeycombs and removes the honeycombs after having been flailed. Depending on the thickness of the honeycombs, the user can easily raise and lower the feeder and extractor roller members relative to the first and second roller conveyors. In addition, the user can vertically adjust the upper and lower flailing elements by unsecuring the bearings in the elongate slots of the upright members and moving the bearings up or down as desired and then resecuring the bearings in the vertical slots.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. An improved apparatus for horizontally decapping wax from both sides of a honeycomb which includes upper and lower flail elements being partially disposed in a gap and having a plurality of chain pieces securely disposed thereabout for uncapping both sides of a honeycomb as the honeycomb is moved across the gap, wherein the improvement comprises:

a frame having upright members;

a means for feeding the honeycombs across the gap;

a first roller conveyor removably mounted to said frame;

a means for extracting the honeycombs after having been flailed; and a second roller conveyor removably mounted to said frame and being spaced from said first roller conveyor to essentially form the gap.

2. The apparatus as claimed in claim 1, wherein said feeder means includes a feeder roller member having a feeder shaft and a tubular member mounted about said feeder shaft and being adapted to move the honeycombs across the gap.

3. The apparatus as claimed in claim 2, wherein said feeder means further includes bracket members secured to said frame; elongate support members each of which is adjustably fastened to a respective said bracket member; bearing members each of which is secured to a respective said elongate support member, each of the ends of said feeder shaft being journaled in a respective bearing member.

4. The apparatus as claimed in claim 3, wherein said first and second roller conveyors each includes a rack and a plurality of rollers laterally aligned and spaced apart and being rotatably mounted to said rack.

5. The apparatus as claimed in claim 4, wherein said frame includes mounting bracket members, said first and second roller conveyors removably mounted upon said mounting bracket members.

6. The apparatus as claimed in claim 5, wherein said feeder roller member is disposed and adjustably spaced above said first roller conveyor near a back end thereof, said feeder roller member being essentially parallel and proximate to said upper flailing element.

7. The apparatus as claimed in claim 6, wherein said extractor means includes an extractor roller member having an extractor shaft and a tubular member mounted about said extractor shaft and being adapted to move the honeycombs after having been flailed.

8. The apparatus as claimed in claim 7, wherein said extractor means further includes bracket members secured to said frame; elongate support members each of which is adjustably fastened to a respective said bracket member; bearing members each of which is secured to a respective said elongate support member, each of the ends of said extractor shaft being journaled in a respective bearing member.

9. The apparatus as claimed in claim 8, wherein said extractor roller member is disposed and adjustably spaced above said second roller conveyor near a front end thereof, said extractor roller member being essentially parallel and proximate to said upper flailing element opposite of said feeder roller member.

10. The apparatus as claimed in claim 9, further includes a motor, sprocket members mounted upon said feeder roller member, said extractor roller member and said motor, and an endless chain carried by said sprocket members for driving both said feeder roller member and said extractor roller member.

11. The apparatus as claimed in claim 1, wherein said upper and lower flailing elements are adjustably spaced relative to one another.

12. The apparatus as claimed in claim 11, wherein said upright members of said frame includes elongate slots.

13. The apparatus as claimed in claim 12, wherein said upper flailing element comprises ends which are journaled in bearings, said bearings being movably secured in said slots of said upright members.

14. The apparatus as claimed in claim 13, further includes a motor mounted on said frame, a variable speed pulley mounted upon said motor, and an endless belt carried by said variable speed pulley, the size of which determines the speed of said flailing elements.

* * * * *